United States Patent
Birch et al.

(10) Patent No.: US 9,712,962 B2
(45) Date of Patent: Jul. 18, 2017

(54) PUBLIC AND PRIVATE GEO-FENCES

(71) Applicant: Intel Corporation, Santa Clara, CA (US)

(72) Inventors: Thomas A. Birch, Portland, OR (US); Derick Arnold Johnson, Folsom, CA (US); Kenneth W. Reese, Portland, OR (US); Thomas H. Calvert, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/768,704

(22) PCT Filed: Dec. 13, 2013

(86) PCT No.: PCT/US2013/075107
§ 371 (c)(1),
(2) Date: Aug. 18, 2015

(87) PCT Pub. No.: WO2014/130145
PCT Pub. Date: Aug. 28, 2014

(65) Prior Publication Data
US 2016/0007151 A1  Jan. 7, 2016

Related U.S. Application Data

(60) Provisional application No. 61/768,185, filed on Feb. 22, 2013, provisional application No. 61/768,242, filed on Feb. 22, 2013.

(51) Int. Cl.
H04W 24/00 (2009.01)
H04W 4/02 (2009.01)
(Continued)

(52) U.S. Cl.
CPC ....... *H04W 4/021* (2013.01); *H04M 1/72572* (2013.01); *H04W 4/043* (2013.01); *H04L 63/107* (2013.01); *H04W 12/08* (2013.01)

(58) Field of Classification Search
None
See application file for complete search history.

(56) References Cited

U.S. PATENT DOCUMENTS 8,019,532 B2 * 9/2011 Sheha .................... G01C 21/20
                                                           340/995.1
8,583,091 B1 * 11/2013 Delker ................... H04L 67/34
                                                           455/404.2
(Continued)

FOREIGN PATENT DOCUMENTS

KR  1020080113123 A  12/2008
KR  1020100118875 A  11/2010
(Continued)

OTHER PUBLICATIONS

Available at https://www.etracllc.com/etrac/uploads/Geo%20Fence%20Setup%20Instructions.pdf, Apr. 22, 2009.*
(Continued)

Primary Examiner — Martin Mushambo
(74) Attorney, Agent, or Firm — Schwegman Lundberg & Woessner, P.A.

(57) ABSTRACT

Embodiments for implementing public and private geo-fences are generally described herein. A system comprises a geo-fence server adapted to: receive geographical coordinates of a device; determine that the device is located in a geo-fence; determine a type of the geo-fence; and transmit a notification to the device based on the type of the geo-fence. A mobile device for using person-to-person geo-fences is adapted to: receive a geo-fence object; store the geo-fence object at the mobile device; subsequent to storing the geo-fence object, obtain a geographical position of the
(Continued)

mobile device; determine whether the mobile device is located in a geo-fence based on the geographical position; determine whether the geo-fence object is associated with the geo-fence; and present the geo-fence object when the geo-fence object is associated with the geo-fence.

24 Claims, 9 Drawing Sheets

(51) Int. Cl.
*H04M 1/725* (2006.01)
*H04W 4/04* (2009.01)
*H04L 29/06* (2006.01)
*H04W 12/08* (2009.01)

(56) References Cited

U.S. PATENT DOCUMENTS

| | | | | |
|---|---|---|---|---|
| 2005/0159883 | A1* | 7/2005 | Humphries | B60R 25/00 701/517 |
| 2006/0195914 | A1* | 8/2006 | Schwartz | G06F 21/645 726/32 |
| 2009/0144375 | A1* | 6/2009 | Maltempo | H04L 51/38 709/206 |
| 2010/0171712 | A1* | 7/2010 | Cieplinski | G06F 3/04883 345/173 |
| 2011/0112768 | A1* | 5/2011 | Doyle | G06Q 10/08 701/300 |
| 2011/0306304 | A1* | 12/2011 | Forutanpour | G06F 3/04883 455/67.11 |
| 2012/0008526 | A1* | 1/2012 | Borghei | H04W 4/021 370/254 |
| 2012/0302258 | A1 | 11/2012 | Pai et al. | |
| 2012/0319825 | A1* | 12/2012 | Shimy | H04L 12/2818 340/12.5 |
| 2013/0006663 | A1 | 1/2013 | Bertha et al. | |

FOREIGN PATENT DOCUMENTS

| | | |
|---|---|---|
| KR | 1020120076698 A | 7/2012 |
| WO | WO-2014130145 A1 | 8/2014 |

OTHER PUBLICATIONS

"International Application Serial No. PCT/US2013/075107, International Search Report mailed Apr. 15, 2014", 3 pgs.

"International Application U.S. Appl. Serial No. PCT/US2013/075107, Written Opinion mailed Apr. 15, 2014", 7 pgs.

* cited by examiner

PUBLIC AND PRIVATE GEO-FENCES

CLAIM OF PRIORITY

This patent application is a U.S. National State Application under 35 U.S.C. 371 from International Application PCT/US2013/075107, filed Dec. 13, 2013, published as WO 2014/130145 on Aug. 28, 2014, which claims the benefit of U.S. Provisional Patent Application Ser. No. 61/768,185, titled "GEOAPP SPONSORED-PUBLIC-PRIVATE-PERSONAL GEO-FENCES," filed Feb. 22, 2013, and U.S. Provisional Patent Application Ser. No. 61/768,242, titled "GEOAPP-LOCALIZED PRIVATE AND PERSONAL GEO-FENCES," filed on Feb. 22, 2013, each of which is hereby incorporated by reference in their entireties.

TECHNICAL FIELD

Embodiments described herein generally relate to geo-fence technology and in particular, to public and private geo-fences.

BACKGROUND

The widespread availability of multi-functional mobile devices has resulted in having these devices as an integral medium for everyday activities. Mobile devices are capable of displaying maps, using position sensing technologies (e.g., global positioning system (GPS)), and providing alerts via text, graphics, audio, and the like.

A geo-fence is a virtual boundary around a geographic location. When a location-aware mobile device enters or exits a geo-fenced area, various actions may occur, such as presenting a notification on the mobile device. Geo-fences are used in a variety of applications, including security, insurance, and recreation.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
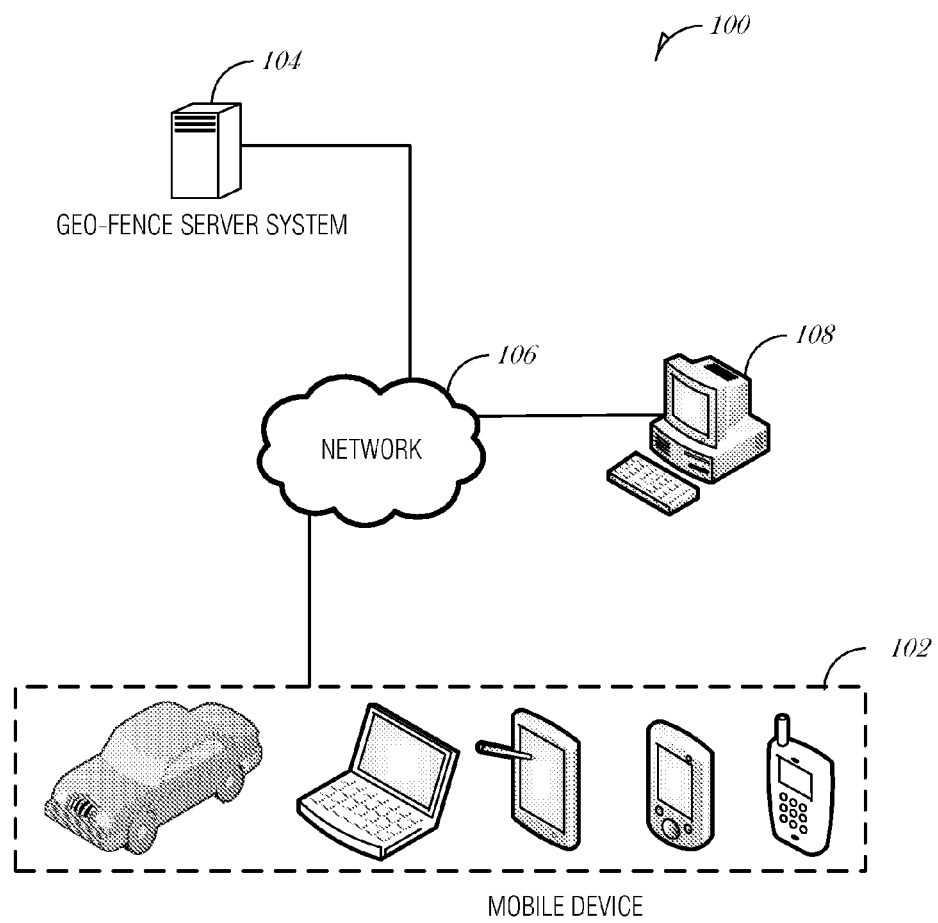
FIG. 1 is a schematic drawing illustrating a geo-fence system, according to an embodiment.

As people increasingly rely on mobile devices in their day-to-day lives, creating and managing location-based applications from a mobile device is correspondingly becoming more important. One useful technology for location-based applications is geo-fencing. Geo-fencing includes creating and managing a geo-fence, which is a virtual boundary of a geographical area. A geo-fence may be considered an object (e.g., a geo-fence object), such that the geo-fence may have various properties like objects in other disciplines, such as object-oriented programming. In this way, a geo-fence object may include attributes and functions.

Attributes may include data, such as a name, unique identifier, coordinates defining the geo-fence (e.g., a latitude/longitude or a relative coordinate system), an active and expiration date/time, permissions, and the like.

Functions may include actions such as notifications on entry/exit of a geo-fence, application download or initiation upon entry/exit, or other actions that occur on a user's mobile device or are caused to occur on another device associated with the user or on another user's device.

For example, a geo-fence may have attributes such as a name, "Memorial Day Sale" and a location, e.g., situated to enclose a store location at a mall. The geo-fence may have a beginning date of midnight, May 25, 2013 and an expiration date of midnight, May 28, 2013. The "Memorial Day Sale" geo-fence may have functions associated with it such that when a user enters the geo-fence a coupon notification is pushed to the user's device. The coupon notification may include a mechanism that allows the user to navigate to a web page (e.g., embedded web link), which displays a coupon for the Memorial Day Sale at the store.

Geo-fences are becoming more prevalent. As they do, an ever increasing number will be available to users. However, creators may not want to provide a geo-fence to everyone that enters a particular geographical area. For example, creators may want to restrict the availability or use of a geo-fence to certain individuals, groups, or subsets of a population. In addition, users may not want to be notified of every geo-fence present in an area. Users may not trust that the geo-fences are valid or from a trusted source. Because a geo-fence notification may initiate a download to a user's mobile device, concerns over privacy, hacking, or other malicious software may exist. Thus, what are needed are mechanisms to create geo-fences with specific permissions, transmit geo-fence data securely, and manage geo-fence notifications.

Geo-fence notifications are understood to include alerts, notifications, queries, or other prompts that are provide to a user via a user device. The notifications may be communicated with audio, visual, tactile (e.g., vibration), or combinations thereof. Many mobile devices include a notification interface, such as a drop down screen that includes pending or unacknowledged notifications (e.g., notifications in queue).

In addition to geo-fence notifications that provide information, a geo-fence notification may also provide a mechanism to download, install, or launch an application. The application may be stored local to the user device or remote from the user device. The mechanism to download, install, or launch the application may include use of a hyperlink, remote procedure call, or other mechanism to initiate the download, installation, or execution. Once an application is available on a user device, it may be accessed in the same manner as other applications on the device.

FIG. 1 is a schematic drawing illustrating a geo-fence system 100, according to an embodiment. The geo-fence system 100 includes a mobile device 102 and a geo-fence server system 104, which are connected over a network 106. While the geo-fence server system 104 is illustrated as a single machine in FIG. 1, in various embodiments, the geo-fence server system 104 may comprise multiple servers working together (e.g., colocated, distributed, or as a cloud-based system).

The mobile device 102 includes devices such as a smartphone, cellular telephone, mobile phone, laptop computer, tablet computer, Ultrabook®, in-vehicle computer, or other portable networked device. In general, the mobile device 102 is small and light enough to be considered portable (e.g., carried by a person) or is attached or incorporated into mobile equipment (e.g., an automobile in-dash system, a golf cart navigation system, etc.). In addition, the mobile device 100 generally includes a mechanism to connect to the network 108, either over a persistent or intermittent connection. The mobile device 102 may include a proximity module. The proximity module may periodically, continuously, or regularly obtain a user's location. In an embodiment, the user's location is determined with technologies such as global positioning system (GPS), assisted GPS, radio frequency triangulation (e.g., cellular triangulation or Wi-Fi® triangulation), or other location aware services. The proximity module may communicate with a server (e.g., a cloud-based service) to obtain the location of the mobile device 102. The mobile device 102 may be arranged to transmit and receive wireless signals using various technologies. Examples of wireless technologies include, but are not limited to Bluetooth™, Wi-Fi®, cellular, radio-frequency identification (RFID), WiMAX®, and the like.

In operation, a user may operate a mobile device 102 while travelling. The mobile device 102 periodically or recurrently determines its position (e.g., latitude/longitude, "lat/long") and transmits the position to the geo-fence server system 104. In response, the geo-fence server system 104 determines whether the mobile device 102 is within a geo-fence. If so, the geo-fence server system 104 transmits details of the geo-fence or geo-fences that the mobile device 102 is within. The polling interval, the interval between queries from the mobile device 102 to the geo-fence server system 104, is configurable in some embodiments. In an embodiment, the polling interval is equal to the timeout period. Thus, for example, a polling interval may be configured to be two minutes. So, every two minutes the mobile device 102 transmits the lat/long to the geo-fence server system 104 with an express or implied request for relevant geo-fence information. When a geo-fence is identified and returned to the mobile device 102, the mobile device 102 presents the notification associated with the geo-fence.

In addition, FIG. 1 includes a computing device 108 connected to the geo-fence server system 104 via the network 106. The computing device 108 may be any type of device including a desktop computer, smartphone, cellular telephone, mobile phone, laptop computer, tablet computer, Ultrabook®, in-vehicle computer, kiosk, or other networked device.

In operation, a user may use the computing device 108 to connect to the geo-fence server system 104 to create, modify, or delete a geo-fence. As discussed above, geo-fences may be viewed in terms of objects, having attributes and functions. The attributes may also be referred to as properties, meta-data, or tags. Functions may be referred to as actions, operations, or processes. However they are referred to, attributes describe a geo-fence and functions describe what happens when a geo-fence is encountered.

Figure 2:
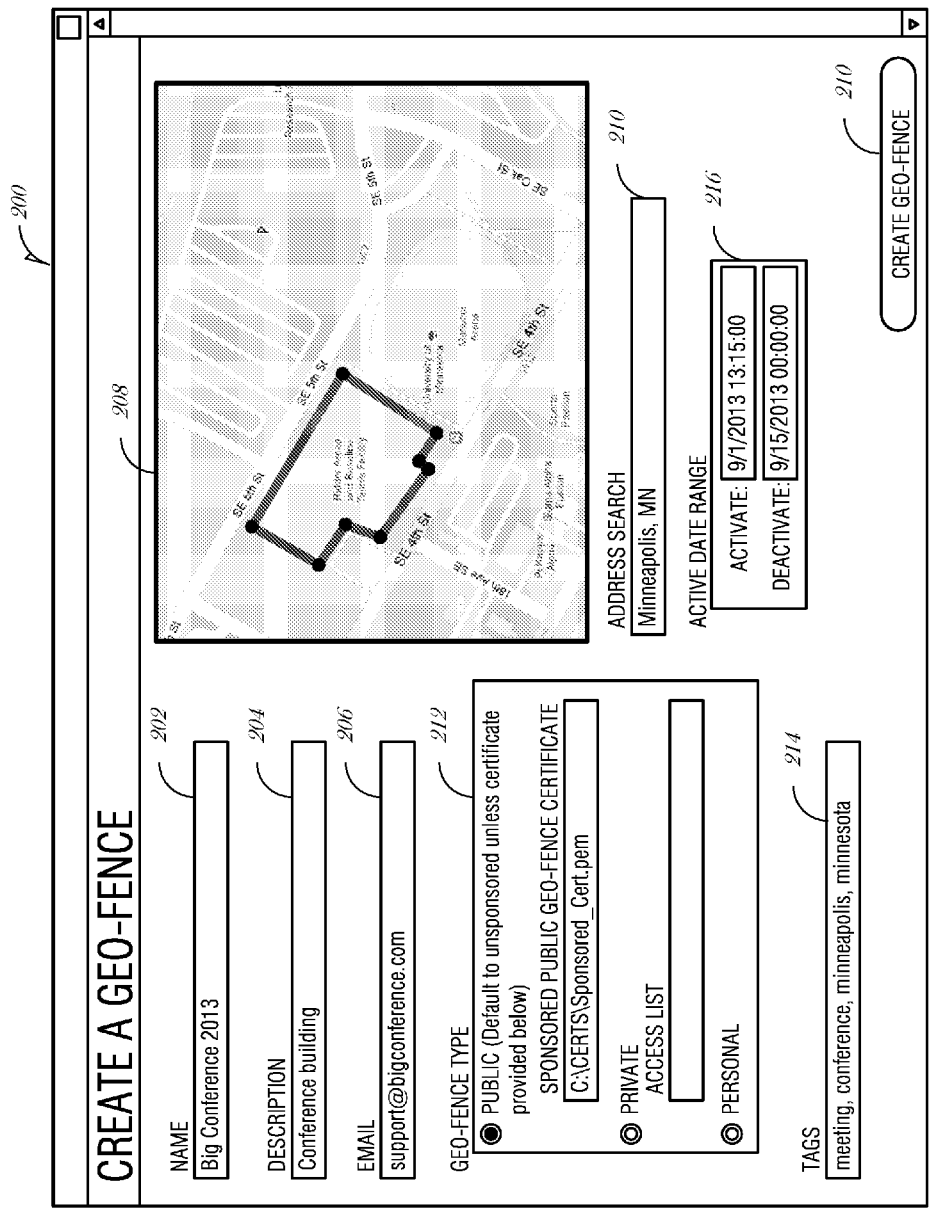
FIG. 2 is an example user interface for managing geo-fences, according to an embodiment.

A user may access the geo-fence system 104 and create a geo-fence by providing one or more attributes or functions. FIG. 2 is an example user interface 200 for managing geo-fences, according to an embodiment. To create a geo-fence, a user may input a name in the name field 202, a description in the description field 204, and an email address in the email field 206. The name field 202 and description field 204 are used to describe the geo-fenced area. The name is used to identify the geo-fence and may be displayed on a user's device, such as when the user enters the geo-fence. The email field 206 is used to indicate who is responsible for the geo-fence. An email is sent to the address(es) in the email field 206 upon creation of the geo-fence. The owner (one who is associated with the email address) is then able to receive notification, reports, or other information about the geo-fence. The email field 206 may include a single email address, a list of email addresses, or other mechanism to identify recipients (e.g., a distribution list name).

The user interface 200 also includes a map 208 and an address search field 210 to graphically define the geo-fence. The address search field 210 may be used to quickly navigate to a certain location (to be displayed on the map 208), after which the user may further navigate in the map 208 using zoom, pan, or rotate tools. Once at the desired location, the user may interact with the map 208 to create an outline to define the geo-fence. The geo-fence may be defined using various input mechanisms, including but not limited to touch sensitive panels, mouse, keyboard, stylus, and the like. The geo-fence may be defined using a point-and-radius mechanism or a point-by-point polygon mechanism Various mechanisms may be used to create the geo-fence, such as tracing an area on the map, clicking/touching points on the map to serially create vertices that result in a polygon, or automatic building detection routines, for example. Other mechanisms such as drawing circles, squares, rectangles, or other polygons on the map 208 with drawing tools are encompassed in the scope of interacting with the map 208 to create a geo-fence.

Further, the user interface 200 includes a type selection 212 to select the type of geo-fence to create. In various embodiments, there are two types of public geo-fences and two types of private geo-fences. In general, public geo-fences allow anyone to receive a notification/alert. In a public geo-fence, upon entering (or exiting) anyone may be presented a notification and view the contents associated with the geo-fence. In some cases, a public geo-fence may be classified as a sponsored public geo-fence or an unsponsored public geo-fence. When geo-fences and associated applications are deemed "sponsored," it means that the fence and its content are "certified" by a trusted third party. Sponsored geo-fences may be managed through a secure service that validates the authenticity of the geo-fence and the associated applications content. This may be a trusted third party facilitating the definition and applications associated with a geo-fence. There are no restrictions on the audience or targeted user base of these geo-fences or applications. Sponsored geo-fences may be hosted in a cloud. When presented on an end-user device, a sponsored geo-fence may include an indication that it is sponsored, such as with a lock icon or a certificate icon or other indicia. Unsponsored geo-fences are not validated and when presented to a user, unsponsored geo-fences are not indicated as being "trusted." As such, users should understand that the information is being provided without condition and may not be legitimate.

In the example user interface illustrated in FIG. 2, an unsponsored public geo-fence is the default geo-fence type. To create a sponsored public geo-fence, the user has to provide the file path to a certificate used to validate the sponsor. Leaving the sponsored geo-fence certificate field blank results in the creation of an unsponsored (e.g., generic public) geo-fence, unless another radio button is selected. In the example illustrated in FIG. 2, the user has provided the path "C:\CERTS\Sponsored_Cert.pem" as a path to a certificate, which will be used the validate the sponsor and create a sponsored geo-fence. In some embodiments the certificate may be used to sign the geo-fence or as a basis to provide an indication that the geo-fence is a sponsored geo-fence (e.g., with use of a special icon on the geo-fence notification).

In contrast to a public geo-fence, a private geo-fence is only presented to people who are on an access list. There are two types of private geo-fences, those that are private to one or more other individuals other than the creator of the geo-fence and those that are private to the creator. Thus, for the purposes of this discussion, a private geo-fence is understood to refer to a geo-fence for one or more people (which may include the creator) and a personal geo-fence is understood to refer to a geo-fence only for the person who created it.

Private geo-fences are those used within a known group of individuals. Such groups may be defined by various social networking groups, such as a Google® Circle, a group of friends in Facebook®, or an individually managed group of people (e.g., email distribution list). Groups may be created using any identifying information, such as phone numbers, email addresses, or the like.

The user interface 200 also includes a tag input field 214, which may be used to provide contextual tags. The tags may be displayed to a user, used to search or filter geo-fences, or the like.

The user interface 200 also includes an active date range input 216, which may be used to indicate an effective starting date and time (activation time), and an effective ending date and time (deactivation time). If the activation field is left blank, the geo-fence will be available substantially immediately after creation. If the deactivation field is left blank, then the geo-fence will exist into perpetuity. There may be a reasonable default duration, such as one year on a geo-fence where the deactivation field is left blank. The default duration may be configurable.

After a user provides the desired information in the appropriate input fields on the user interface 200, the user may activate the "create geo-fence" control 210 to create the geo-fence. Appropriate error handling mechanisms may be used, such as by ensuring that a proper path and file name is used in the geo-fence type inputs or that the dates are properly formatted (if existent) in the active date range input 216. Once a geo-fence is created, it may be assigned a unique identifier. The unique identifier may be locally significant or globally significant, according to various embodiments and desired design attributes.

Figure 3:
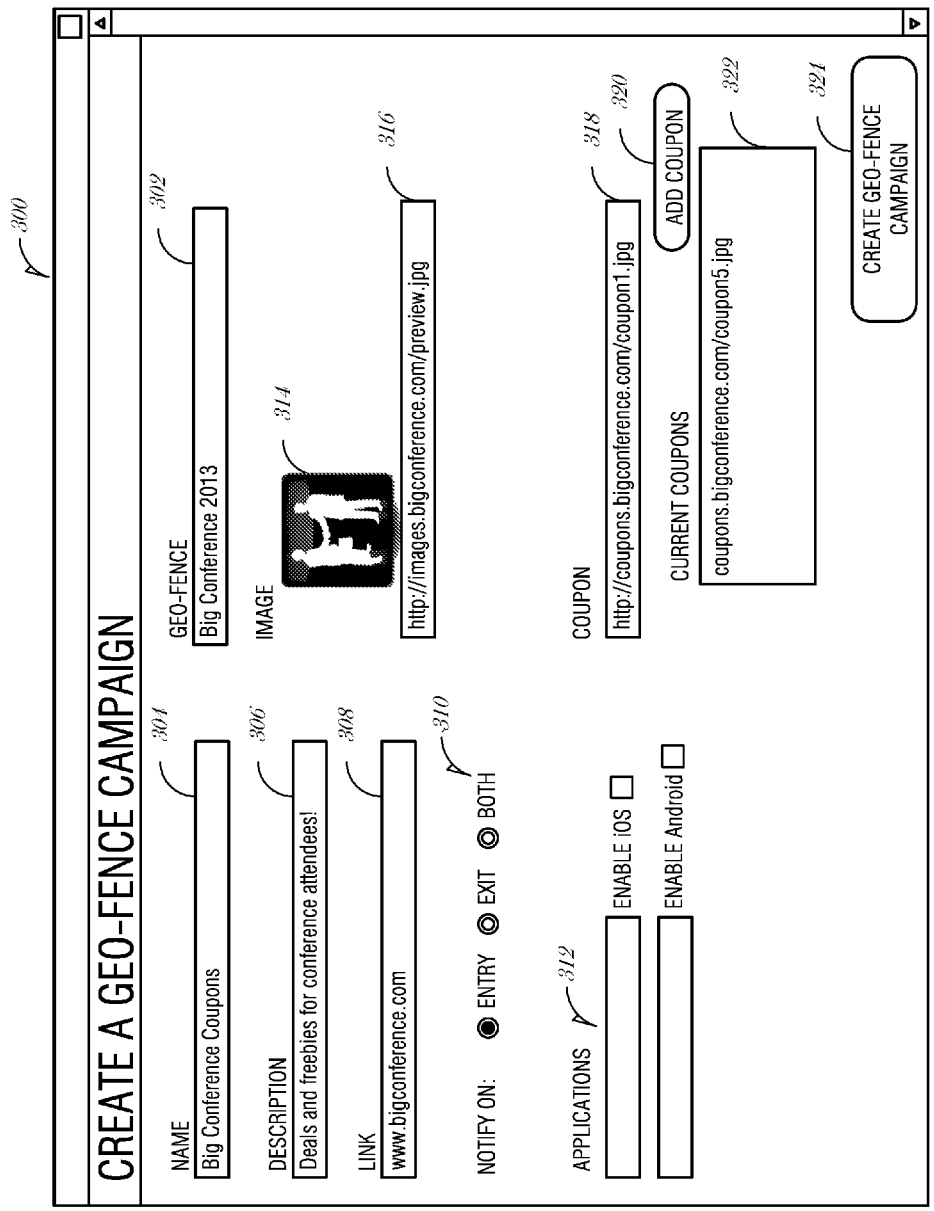
FIG. 3 is an example user interface for managing geo-fence campaigns, according to an embodiment.

After a geo-fence is created, such as by way of the interface depicted in FIG. 2, a user may create one or more campaigns to associate with the geo-fence. A campaign is an activity designed to promote a product, service, or business. Campaigns may include an application (e.g., to download or execute on a user device), a map, a coupon, or other information about a product, service, or business. FIG. 3 is an example user interface 300 for managing geo-fence campaigns, according to an embodiment.

Using the using interface 300 illustrated in FIG. 3, a user may specify a geo-fence in the geo-fence input 302. The geo-fence input 302 may be a dropdown list with one or more geo-fences that the user is permitted to modify by associating a campaign with the selected geo-fence. The geo-fence campaign includes attributes, such as a name and description. The name and description may appear on the user device upon notification of the geo-fence. Accordingly, the user interface 300 includes a name field 304 and a description field 306 to provide the appropriate information. Additionally, the user interface 300 includes a link field 308, which may be displayed or provided to the user on a user device and may be used to navigate (e.g., with a browser installed on the user device) to a web page or other online destination. The notify control 310 allows the user to control whether a notification of the geo-fence campaign appears to a user upon entry to the geo-fence, exit from the geo-fence, or both. A user may also indicate an image to provide to the user device when entering a geo-fence using the image preview 314 and image location input 316 controls.

Using the applications control 312, the user may indicate one or more applications that are available for download or execution on the user device. The applications may be available for download from an electronic marketplace designed to deliver such content to the user device. Such applications may be restricted to only execute while the user is in the associated geo-fence. To indicate a download location or electronic marketplace, the user may provide a location or other access mechanism. In the example in FIG. 3, the applications control 312 provides inputs for the user to indicate a download location for an iOS® application or an Android™ application. These download locations may be the Apple® App Store™ or Android™ Google Play™, in various embodiments.

In addition to, or in place of an application, the user may provide one or more coupons to serve to the user device upon entering/exiting the geo-fence. A user may provide a coupon link in the coupon location 318 and activate the "add coupon" control 320. Current coupons are listed in the coupon listing 322. In the example illustrated, a coupon is a JPEG (Joint Photographic Experts Group) format and displayed as a 3D bar code to a user. Other types of coupons may be used, such as a 2D bar code, linear bar code, print advertisement, or the like. To delete a coupon, a user may highlight a coupon from the coupon listing 322 and press the DELETE key on the keyboard. Other mechanisms may be used to manage coupons as one of ordinary skill will appreciate.

After the appropriate information is provided, the user may activate the "create geo-fence campaign" control 324 to create the campaign. Campaigns are active when the underlying geo-fence is active. Campaigns may exist in a many-to-one relationship or a many-to-many relationship with geo-fences.

In an embodiment, defining a geo-fence and the associated content with that geo-fence is managed on a server in the cloud. This is where the geo-fence is flagged as sponsored, public, private, or personal. This flag field is then used to determine which of the geo-fences, if any, should be presented to a device that has entered the geo-fence and requested any available content.

An example use of a private or personal geo-fence is to detect when one leaves a location. For example, a person may want to remind himself of a task to perform as he leaves his house. The person may geo-fence his house and then use a reminder as the description in a campaign. As another example, the person may want to remind his wife to pick up dinner on her way home from work. He may geo-fence the off-ramp to their house, so that when she enters it, she would receive the notification. He may also geo-fence her office building with a notification-on-exit notification.

Private or personal geo-fences may be implemented using the systems described above. Alternatively, private or personal geo-fences may be used in a person-to-person mechanism One such geo-fencing application may execute in the background (e.g., as an operating system service) with the ability to intercept geo-fencing objects via short message service (SMS) or multimedia messaging service (MMS) from a trusted source. Instead of creating complex data models to hold an abundance of personal location-based objects in the cloud, geo-fence objects or campaigns are delivered directly to a user via a geo-fencing service. This solves two problems: having to securely store information in the cloud that could bring dangerous privacy concerns if ever compromised, and having to store large amounts of information resulting from a large number of users creating new content daily.

Use of person-to-person geo-fences is desirable and useful. Instead of storing information on a network (e.g., in a cloud) where the information may be inappropriately disclosed or misused, a person-to-person geo-fence avoids this issue by allowing a creator to create a geo-fence on a device (e.g., a mobile device or a desktop system) and send the created geo-fence to a recipient at a mobile device. The geo-fence may be sent using point-to-point protocols and the geo-fence may be stored at the recipient's device. In this manner, the geo-fence data is less likely to become publicly available.

For "private" person-to-person geo-fencing, one goal is to avoid storing personal or traceable information in the cloud, which could severely impact a user's privacy if the information was compromised. An operating system service version of a geo-app may intercept geo-fence XML objects from SMS or MMS messages and store them locally on the device until the user enters that location. These geo-fence objects may only be received from trusted sources (whitelist), and then they are seamlessly added to the client's geo-fence objects, which are viewable by the user at any time via the service settings interface. These fences may be deleted automatically when a user visits the location and receives the information, when the time restriction on the geo-fence object expires, or at the user's discretion. Any geo-fence objects not from a trusted location are deleted immediately and regarded as spam.

Thus, while FIGS. 2-3 describe creating geo-fences and campaigns in a client-server paradigm, FIGS. 4-7 illustrate examples of user interfaces to create a geo-fence and a campaign in a person-to-person paradigm.

Figure 4:
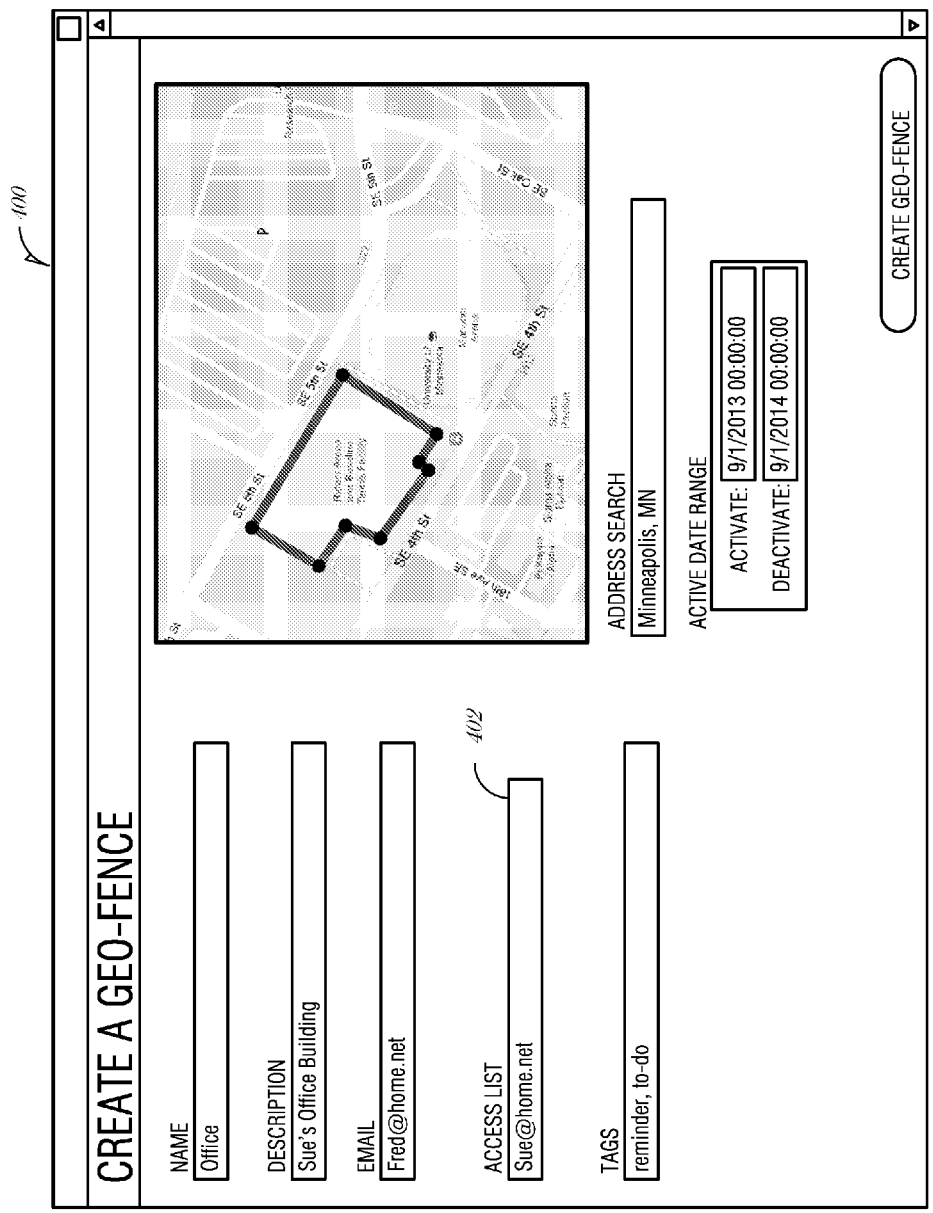
FIG. 4 is an example user interface for managing geo-fences in a person-to-person paradigm, according to an embodiment.

FIG. 4 is an example user interface 400 for managing geo-fences in a person-to-person paradigm, according to an embodiment. The user interface 400 is similar to that depicted in FIG. 2; however several elements are omitted due to the type of geo-fence created. In particular, there is no geo-fence type selection. Instead, there is an access list control 402 where the user may indicate one or more people or groups to receive the person-to-person geo-fence. The access list may be a list of email addresses, phone numbers, or other identifying indicia that resolves to a unique identifier that may be used to deliver the geo-fence object. After a geo-fence object is created, the geo-fence object is delivered to the one or more recipients included in the access list. A program on the recipient's device may then occasionally, regularly, or periodically determine whether the current position of the device places it in the geo-fence defined by the geo-fence object. If so, then it is determined whether any geo-fence campaigns exist for the geo-fence object, and if so, they are presented on the recipient's device.

Creating a campaign in a person-to-person paradigm may be very similar to creating a campaign in a client-server paradigm. However, some information may not typically exist in a person-to-person campaign (e.g., coupons). Thus, the user interface 500 depicted in FIG. 5 for managing geo-fence campaigns in a person-to-person paradigm may be pared down in comparison to the user interface 300 depicted in FIG. 3. In particular, in the example illustrated in FIG. 5, the user interface 500 to create a campaign for a person-to-person geo-fence does not include controls to create applications or coupons.

Figure 5:
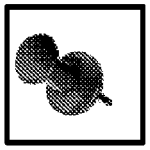
FIG. 5 is an example user interface for managing geo-fence campaigns in a person-to-person paradigm, according to an embodiment.

In the example depicted in FIG. 5, a user is inputting data to create a geo-fence campaign named "Reminder—grocery store" with a description of "Pick up milk." The geo-fence notification will occur on exit from the "Office" geo-fence. An image of a push pin is specified and the image will be used on the notification. In the case when there is no image selected, a default image may be used on the notification.

Figure 6C:
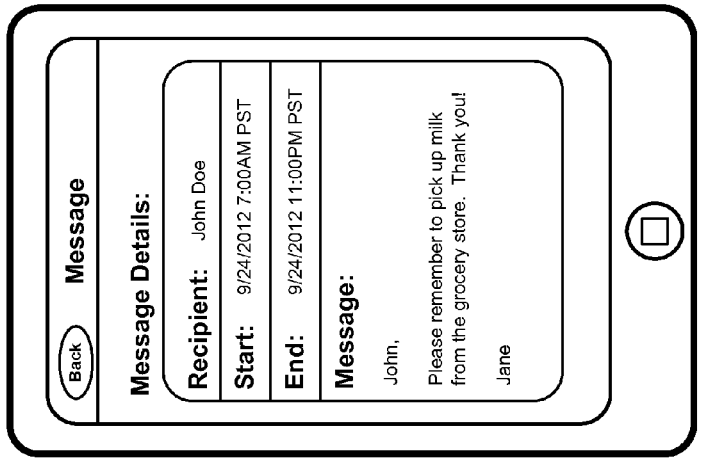
FIGS. 6A-C are user interfaces illustrating a progression of creating and sending a person-to-person geo-fence, according to an example embodiment.
Figure 6B:
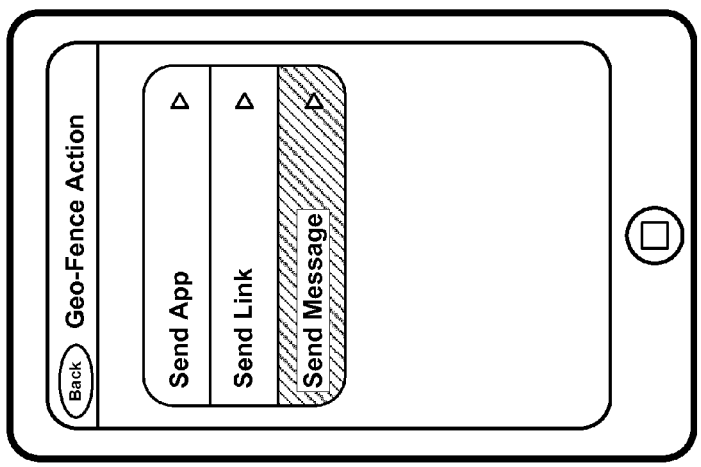
Figure 6A:
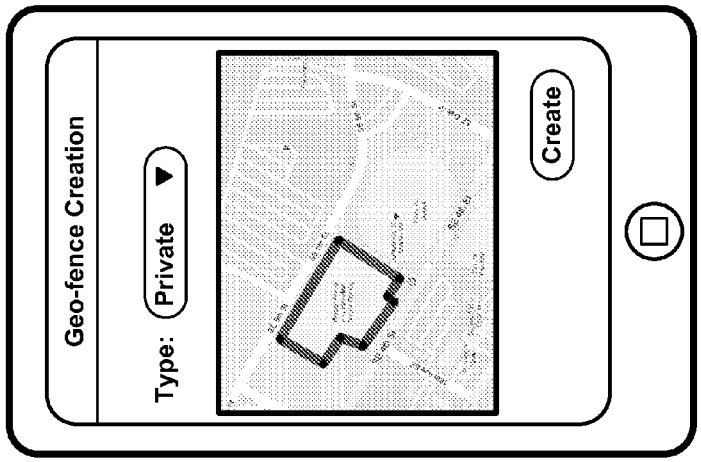

FIGS. 6A-C are user interfaces illustrating a progression of creating and sending a person-to-person geo-fence, according to an example embodiment. FIG. 6A illustrates an example of a creation user interface on a mobile device where a user may navigate to a location and indicate a geo-fence, such as by the mechanisms discussed herein. In the example illustrated, the user may have created the geo-fence by tracing the building on the map, tapping each vertex of the geo-fence, or by using a building detection mechanism, in various embodiments. After selecting the geographical area desired, the user may create the geo-fence with the create control. In FIG. 6B, the user may then select one of three objects to associate with the geo-fence. Although not shown in this example, it is understood that the user may opt to associate more than one object with a geo-fence, or more than one of a particular object type (e.g., two messages, one for when the target user enters the geo-fence and one for when the target user exits the geo-fence). In the example illustrated in FIGS. 6B-C, the user selects a message to send to the recipient user. In this case, the message is a reminder, as illustrated in FIG. 6C. The reminder message will be presented to the recipient user when the recipient user enters the geo-fence. In other embodiments, the user interface illustrated in FIGS. 6A-6C may include controls to allow the creating user to specify whether the object is presented on entry to a geo-fence, exit from a geo-fence, or both.

In an embodiment, the message is sent to the recipient over a messaging service (e.g., SMS or MMS) and the message is stored at the recipient's device. When the recipient is in the geo-fenced area, the recipient is presented the message. The interfaces in FIG. 6C allow for the sending user to include a start and end time (activation and expiration times) of the associated message.

Figure 7C:
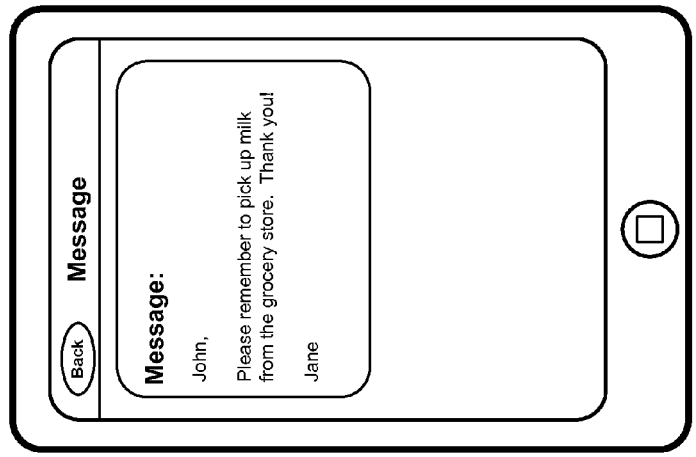
FIGS. 7A-C are user interfaces illustrating a progression of receiving and displaying a person-to-person geo-fence, according to an example embodiment.
Figure 7B:
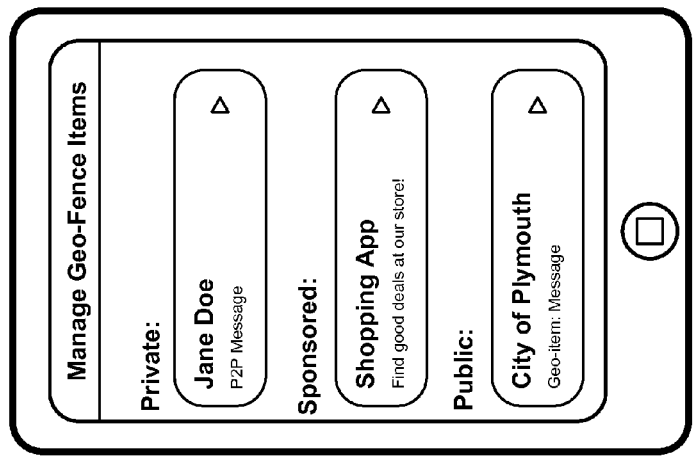
Figure 7A:
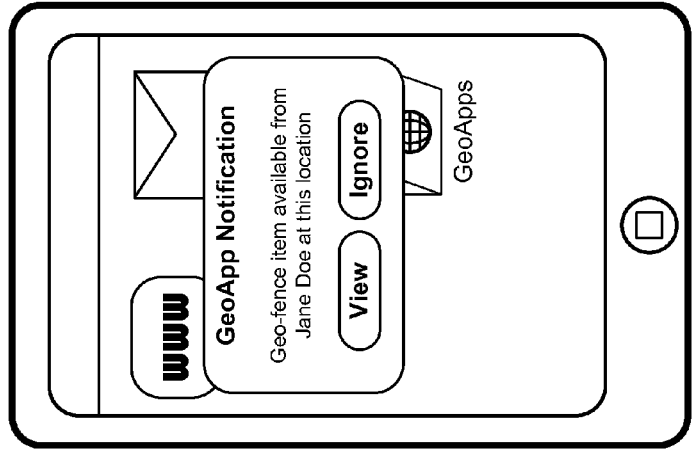

FIGS. 7A-C are user interfaces illustrating a progression of receiving and displaying a person-to-person geo-fence, according to an example embodiment. FIG. 7A illustrates a notification presented to a user (e.g., John) when the user enters a geo-fenced area. In the illustration of FIG. 7A, it is assumed that the user entered the geo-fence during a valid time when the geo-fence and the message were active. The user is presented Private, Sponsored, and Public objects (e.g., messages, applications, or links) and may optionally view one or more of the objects (FIGS. 7B-C). In an embodiment, messages for private person-to-person geo-notifications are retrieved from local storage and presented upon the user's device entering the pre-designated geo-fenced area. By using point-to-point communication, sensitive data is not stored on a third-party server, such as in the cloud, and is not susceptible to misuse or abuse. Additionally, storage requirements are lower because the storage is spread across all of the users of the system, rather than localized and centralized at a server. Such features may be implemented in smartphone, notebook, or Ultrabook with the appropriate capabilities.

In order to receive a person-to-person geo-fence object, the recipient may specify and maintain a list of trusted senders. These trusted senders may be identified by some unique identification, such as a username, a phone number, an email address, or the like. If a person-to-person geo-fence object is detected in a geo-fence and the sender is not recognized, the recipient may not be notified of the object or the geo-fence. Alternatively, the recipient may be presented an alert that a person-to-person geo-fence object is available, but that it originates from an untrusted source. Other mechanisms such as whitelisting, blacklisting, temporarily allowing senders or content, and other permission management may be used at the recipient's device to filter, control, and manage notifications.

Although FIGS. 6 and 7 illustrate creating a person-to-person geo-fence for a single recipient, it is understood that more than one recipient may be specified and that the private geo-fence object may then be delivered using a point-to-point messaging service to each of the specified recipients.

Figure 8:
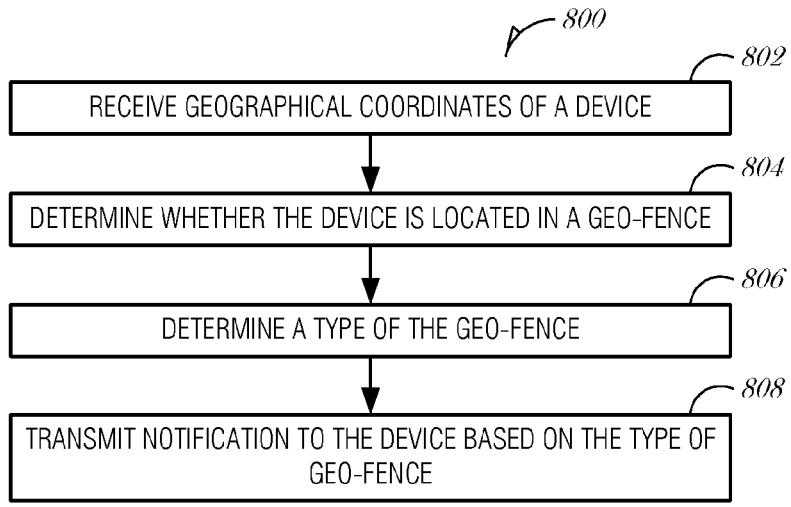
FIG. 8 is flow diagram illustrating a method for using public and private geo-fences, according to an embodiment.

FIG. 8 is flow diagram illustrating a method 800 for using public and private geo-fences, according to an embodiment. At block 802, geographical coordinates of a device are received at a geo-fence server. The device may be a mobile device. The geographical location is determined at the mobile device. Geographical location may be determined in various ways including Global Positioning Systems (GPS), assisted GPS, cellular triangulation, or Wi-Fi triangulation. The result of such positioning systems may be reduced to a latitude/longitude pair. Thus, in an embodiment, the geographical location includes latitude and longitude coordinates.

At block 804, whether the device is located in a geo-fence is determined by the geo-fence server.

At block 806, a type of the geo-fence is determined As discussed above, geo-fences may be public or private. Thus, in an embodiment, the type of the geo-fence area is a private geo-fence.

At block 808, a notification is transmitted to the device based on the type of the geo-fence. The notification may include an application, Internet link, or message. In addition, the notification may include meta-data (e.g., tags), which may be used by the device user to filter, sort, or otherwise organize or manage geo-fence notifications.

When using a private geo-fence, the geo-fence and its objects are only available to select recipients. In an embodiment, to transmit the notification to the device, the method 800 comprises: identifying a user of the device; determining whether the user is a valid recipient of the notification; and transmitting the notification when the user is a valid recipient.

In another embodiment, to transmit the notification to the device, the method 800 comprises: identifying a user of the device; determining whether the user is a member of a group associated with the private geo-fence; and transmitting the notification when the user is a member of the group associated with the private geo-fence. Groups may be defined or organized based on various factors, such as a user-defined group, a group of similar people, or a group from a social network (e.g., Facebook™ friends). In an embodiment, the group is defined based on a social network group associated with the user.

As discussed above, private geo-fences may be private to a group of two or more people or private to a select person. In some cases, the select person may be the creator. In this case, the private geo-fence acts as a personal geo-fence where only the creator is presented the notifications when entering or exiting from a geo-fence. In an embodiment, the private geo-fence is a personal geo-fence. For a private personal geo-fence, the method 800 comprises transmitting the notification to the device comprises: identifying a user of the device; determining whether the user is a creator of the geo-fence; and transmitting the notification when the user is the creator of the geo-fence.

In contrast to a private geo-fence, a public geo-fence is accessible by anyone with the proper equipment. In an embodiment, the type of the geo-fence area is a public geo-fence from a trusted source. The trusted source may be authenticated by a certificate authority or other authentication mechanism. In an embodiment, the trusted source is authenticated using a certificate system. When the private geo-fence notification is presented, it may be presented with an icon, text, or other indicia indicating that the geo-fence notification is authenticated (e.g., signed). Thus, in an embodiment, to transmit the notification, the method 800 comprises transmitting an indication that the public geo-fence is from a trusted source.

Figure 9:
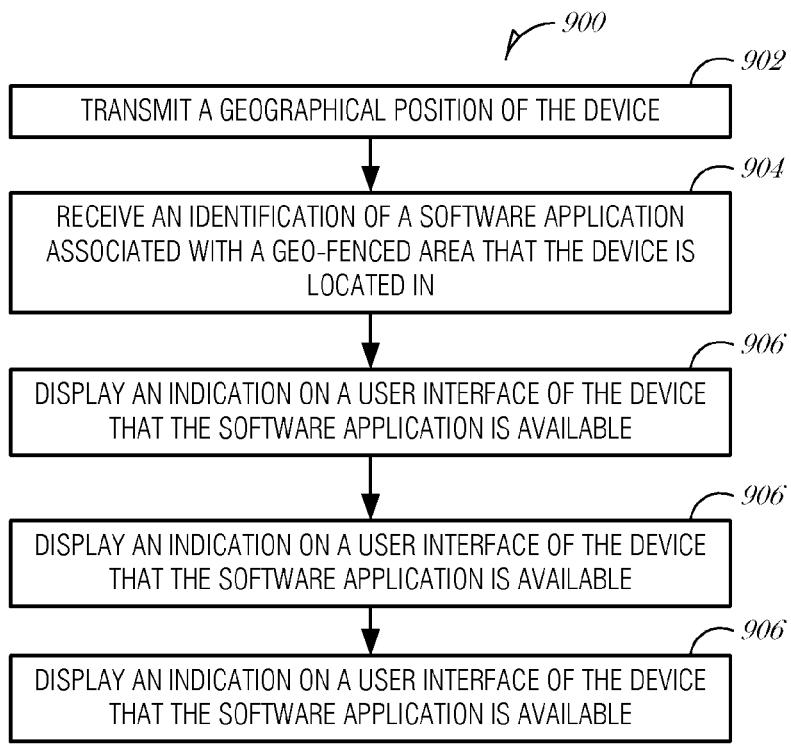
FIG. 9 is a flow diagram illustrating a method for using person-to-person geo-fences, according to an embodiment.

FIG. 9 is a flow diagram illustrating a method 900 for using person-to-person geo-fences, according to an embodiment. At block 902, a geo-fence object is received at a mobile device.

At block 904, the geo-fence object is stored at the mobile device.

At block 906, subsequent to storing the geo-fence object, a geographical position of the mobile device is obtained. The position may be obtained by various means, including Global Positioning System (GPS), assisted GPS, cellular triangulation, or Wi-Fi triangulation, according to various embodiments. From these various means, a latitude and longitude may be derived. Thus, in an embodiment, the position is a latitude and longitude position.

At block 908, whether the mobile device is located in a geo-fence is determined based on the geographical position.

At block 910, whether the geo-fence object is associated with the geo-fence is determined.

At block 912, the geo-fence object is presented when the geo-fence object is associated with the geo-fence. As discussed above, a geo-fence object (e.g., notification, message, application, etc.) may have an activation or an expiration date and time. Thus, in an embodiment, when presenting the geo-fence object, the method 900 comprises determining whether the geo-fence object associated with the geo-fence is active; and presenting the geo-fence object when the geo-fence object is active.

In some embodiments, the recipient device confirms that the source of the geo-fence notification is authentic or trusted. In an embodiment, when receiving the geo-fence object, the method 900 includes evaluation a source of the geo-fence object to determine whether the source is a trusted source, and when storing the geo-fence object, the method 900 includes keeping the geo-fence object when the source is determined to be a trusted source. In another embodiment, the method 900 comprises receiving the geo-fence object from a source; evaluating the source to determine whether the source is a trusted source; and storing the geo-fence object when the source is determined to be a trusted source. After a geo-fence object has been evaluated, an indication, such as an icon may be presented to the user when the notification is presented. In an embodiment, when presenting the geo-fence object, the method 900 comprises presenting an indication that the geo-fence object is from a trusted source.

The evaluation of whether a source is trustworthy or not may be performed at the recipient's device. For example, the device may analyze a whitelist (or blacklist) maintained by the user. As another example, the device may access a contact directory, an email account, or other communications to determine whether the recipient has communicated with the source and infer a trust relationship. In an embodiment, to evaluate the source to determine whether the source is a trusted source, the method 900 comprises identifying the source; accessing a local database to determine whether the source is on a whitelist; and determining that the source is a trusted source when the source is on the whitelist.

If the geo-fence object is not from a trusted source, then the geo-fence object may be deleted, quarantined, or processed in other ways. Such activities may be performed in the background without the user's knowledge. Alternatively, the user may be notified of the attempt to receive or store an unauthorized geo-fence object. In an embodiment, when storing the geo-fence object, the method 900 includes discarding the geo-fence object when the source is determined not to be a trusted source. In another embodiment, the method 900 comprises receiving the geo-fence object from a source; evaluating the source to determine whether the source is a trusted source; and deleting the geo-fence object when the source is determined not to be a trusted source.

The geo-fence object may be transmitted over various communication protocols or mechanism, using various standardized language constructs or data structures. In an embodiment, the geo-fence object is an extensible markup language (XML) object. In an embodiment, the geo-fence object was received over a messaging service. In various embodiments, the messaging service is one of SMS or MMS.

Hardware Platform

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Figure 10:
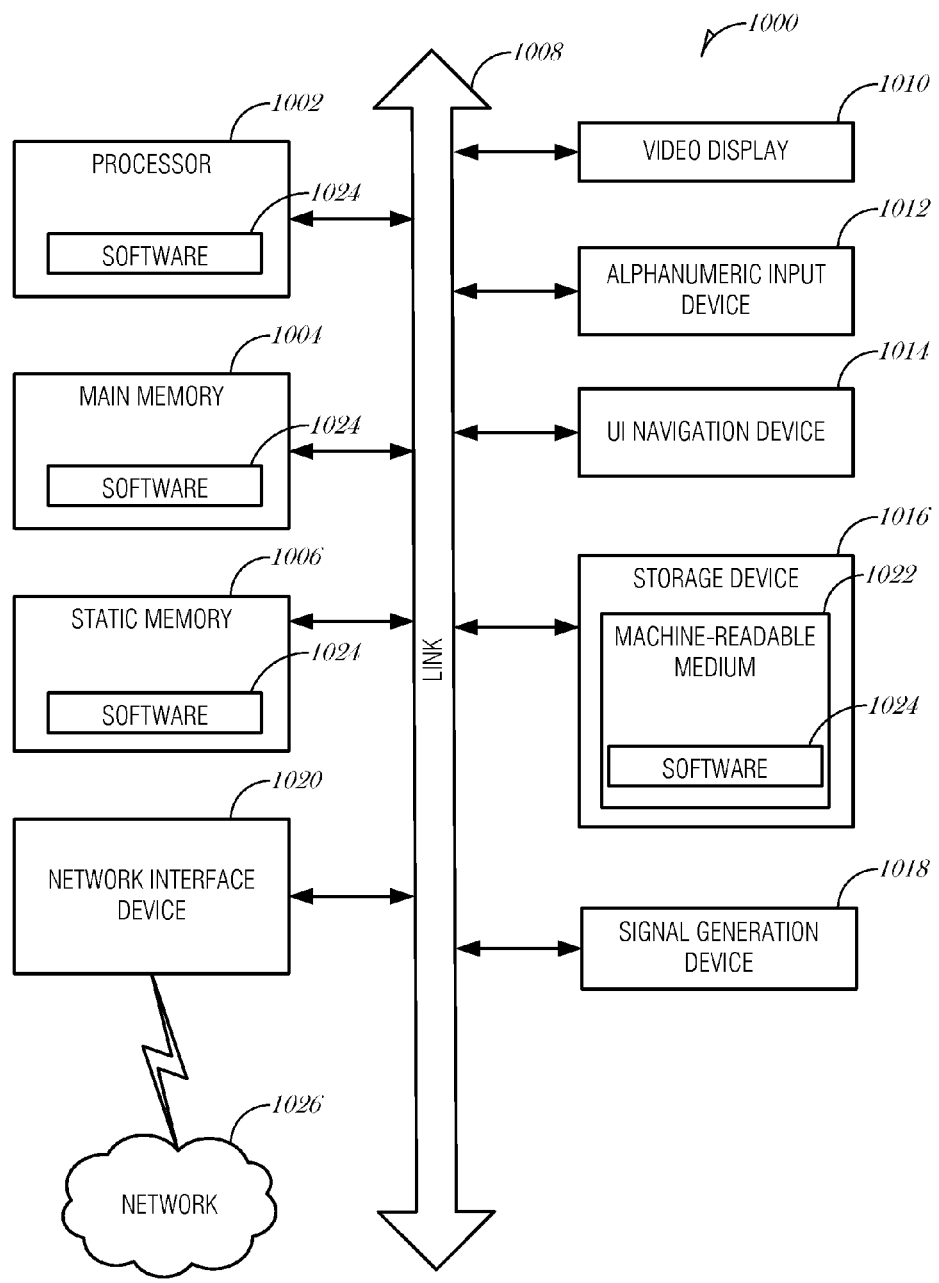
FIG. 10 is a block diagram illustrating an example machine upon which any one or more of the techniques (e.g., methodologies) discussed herein may perform, according to an example embodiment.

FIG. 10 is a block diagram illustrating a machine in the example form of a computer system 1000, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 1000 may further include a video display unit 1010, an alphanumeric input device 1012 (e.g., a keyboard), and a user interface (UI) navigation device 1014 (e.g., a mouse). In one embodiment, the video display unit 1010, input device 1012 and UI navigation device 1014 are incorporated into a touch screen display. The computer system 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples:

Example 1 includes subject matter (such as a device, apparatus, or machine comprising a system for using public and private geo-fences, the system comprising: a geo-fence server adapted to: receive geographical coordinates of a device; determine that the device is located in a geo-fence; determine a type of the geo-fence; and transmit a notification to the device based on the type of the geo-fence.

In Example 2, the subject matter of Example 1 may optionally include, wherein the type of the geo-fence area is a private geo-fence.

In Example 3 the subject matter of any one or more of Examples 1 to 2 may optionally include, wherein to transmit the notification to the device, the geo-fence server is adapted to: identify a user of the device; determine whether the user is a valid recipient of the notification; and transmit the notification when the user is a valid recipient.

In Example 4 the subject matter of any one or more of Examples 1 to 3 may optionally include, wherein to transmit the notification to the device, the geo-fence server is adapted to: identify a user of the device; determine whether the user is a member of a group associated with the private geo-fence; and transmit the notification when the user is a member of the group associated with the private geo-fence.

In Example 5 the subject matter of any one or more of Examples 1 to 4 may optionally include, wherein the group is defined based on a social network group associated with the user.

In Example 6 the subject matter of any one or more of Examples 1 to 5 may optionally include, wherein the private geo-fence is a personal geo-fence.

In Example 7 the subject matter of any one or more of Examples 1 to 6 may optionally include, wherein to transmit the notification to the device, the geo-fence server is adapted to: identify a user of the device; determine whether the user is a creator of the geo-fence; and transmit the notification when the user is the creator of the geo-fence.

In Example 8 the subject matter of any one or more of Examples 1 to 7 may optionally include, wherein the type of the geo-fence area is a public geo-fence from a trusted source.

In Example 9 the subject matter of any one or more of Examples 1 to 8 may optionally include, wherein the trusted source is authenticated using a certificate system.

In Example 10 the subject matter of any one or more of Examples 1 to 9 may optionally include, wherein to transmit the notification, the geo-fence server is adapted to transmit an indication that the public geo-fence is from a trusted source.

Example 11 includes or may optionally be combined with the subject matter of any one of Examples 1-10 to include subject matter (such as a device, apparatus, or machine) comprising a mobile device for using person-to-person geo-fences, the mobile device adapted to: receive a geo-fence object; store the geo-fence object at the mobile device; subsequent to storing the geo-fence object, obtain a geographical position of the mobile device; determine whether the mobile device is located in a geo-fence based on the geographical position; determine whether the geo-fence object is associated with the geo-fence; and present the geo-fence object when the geo-fence object is associated with the geo-fence.

In Example 12, the subject matter of Example 11 may optionally include, wherein to present the geo-fence object, the mobile device is adapted to: determine whether the geo-fence object associated with the geo-fence is active; and present the geo-fence object when the geo-fence object is active.

In Example 13 the subject matter of any one or more of Examples 11 to 12 may optionally include, wherein to receive the geo-fence object, the mobile device is adapted to evaluate a source of the geo-fence object to determine whether the source is a trusted source; and wherein to store the geo-fence object, the mobile device is adapted to keep the geo-fence object when the source is determined to be a trusted source.

In Example 14 the subject matter of any one or more of Examples 11 to 13 may optionally include, wherein the mobile device is adapted to: present an indication that the geo-fence object is from a trusted source when presenting the geo-fence object.

In Example 15 the subject matter of any one or more of Examples 11 to 14 may optionally include, wherein to evaluate the source to determine whether the source is a trusted source, the mobile device is adapted to: identify the source; access a local database to determine whether the source is on a whitelist; and determine that the source is a trusted source when the source is on the whitelist.

In Example 16 the subject matter of any one or more of Examples 11 to 15 may optionally include, wherein to store the geo-fence object, the mobile device is adapted to discard the geo-fence object when the source is determined not to be a trusted source.

In Example 17 the subject matter of any one or more of Examples 11 to 16 may optionally include, wherein the geo-fence object is an extensible markup language (XML) object.

In Example 18 the subject matter of any one or more of Examples 11 to 17 may optionally include, wherein the geo-fence object was received over a messaging service.

In Example 19 the subject matter of any one or more of Examples 11 to 18 may optionally include, wherein the messaging service is one of SMS or MMS.

In Example 20 the subject matter of any one or more of Examples 11 to 19 may optionally include, wherein the geographical position is obtained by Global Positioning Systems (GPS), assisted GPS, cellular triangulation, or Wi-Fi triangulation.

Example 21 includes or may optionally be combined with the subject matter of any one of Examples 1-20 to include subject matter for using public and private geo-fences (such as a method, means for performing acts, machine readable medium including instructions that when performed by a machine cause the machine to performs acts, or an apparatus configured to perform) comprising receiving at a geo-fence server, geographical coordinates of a device; determining by the geo-fence server that the device is located in a geo-fence; determining a type of the geo-fence; and transmitting a notification to the device based on the type of the geo-fence.

In Example 22, the subject matter of Example 21 may optionally include, wherein the type of the geo-fence area is a private geo-fence.

In Example 23 the subject matter of any one or more of Examples 21 to 22 may optionally include, wherein transmitting the notification to the device comprises: identifying a user of the device; determining whether the user is a valid recipient of the notification; and transmitting the notification when the user is a valid recipient.

In Example 24 the subject matter of any one or more of Examples 21 to 23 may optionally include, wherein transmitting the notification to the device comprises: identifying a user of the device; determining whether the user is a member of a group associated with the private geo-fence; and transmitting the notification when the user is a member of the group associated with the private geo-fence.

In Example 25 the subject matter of any one or more of Examples 21 to 24 may optionally include, wherein the group is defined based on a social network group associated with the user.

In Example 26 the subject matter of any one or more of Examples 21 to 25 may optionally include, wherein the private geo-fence is a personal geo-fence.

In Example 27 the subject matter of any one or more of Examples 21 to 26 may optionally include, wherein transmitting the notification to the device comprises: identifying a user of the device; determining whether the user is a creator of the geo-fence; and transmitting the notification when the user is the creator of the geo-fence.

In Example 28 the subject matter of any one or more of Examples 21 to 27 may optionally include, wherein the type of the geo-fence area is a public geo-fence from a trusted source.

In Example 29 the subject matter of any one or more of Examples 21 to 28 may optionally include, wherein the trusted source is authenticated using a certificate system.

In Example 30 the subject matter of any one or more of Examples 21 to 29 may optionally include, wherein transmitting the notification comprises transmitting an indication that the public geo-fence is from a trusted source.

Example 31 includes or may optionally be combined with the subject matter of any one of Examples 1-30 to include subject matter for using person-to-person geo-fences (such as a method, means for performing acts, machine readable medium including instructions that when performed by a machine cause the machine to performs acts, or an apparatus configured to perform) comprising receiving a geo-fence object at a mobile device; storing the geo-fence object at the mobile device; subsequent to storing the geo-fence object, obtaining a geographical position of the mobile device; determining whether the mobile device is located in a geo-fence based on the geographical position; determining whether the geo-fence object is associated with the geo-fence; and presenting the geo-fence object when the geo-fence object is associated with the geo-fence.

In Example 32, the subject matter of Example 31 may optionally include, wherein presenting the geo-fence object comprises: determining whether the geo-fence object associated with the geo-fence is active; and presenting the geo-fence object when the geo-fence object is active.

In Example 33 the subject matter of any one or more of Examples 31 to 32 may optionally include, wherein receiving the geo-fence object includes evaluating a source of the geo-fence object to determine whether the source is a trusted source; and wherein storing the geo-fence object includes keeping the geo-fence object when the source is determined to be a trusted source.

In Example 34 the subject matter of any one or more of Examples 31 to 33 may optionally include, presenting an indication that the geo-fence object is from a trusted source when presenting the geo-fence object.

In Example 35 the subject matter of any one or more of Examples 31 to 34 may optionally include, wherein evaluating the source to determine whether the source is a trusted source comprises: identifying the source; accessing a local database to determine whether the source is on a whitelist; and determining that the source is a trusted source when the source is on the whitelist.

In Example 36 the subject matter of any one or more of Examples 31 to 35 may optionally include, wherein storing the geo-fence object includes discarding the geo-fence object when the source is determined not to be a trusted source.

In Example 37 the subject matter of any one or more of Examples 31 to 36 may optionally include, wherein the geo-fence object is an extensible markup language (XML) object.

In Example 38 the subject matter of any one or more of Examples 31 to 37 may optionally include, wherein the geo-fence object was received over a messaging service.

In Example 39 the subject matter of any one or more of Examples 31 to 38 may optionally include, wherein the messaging service is one of SMS or MMS.

In Example 40 the subject matter of any one or more of Examples 31 to 39 may optionally include, wherein the geographical position is obtained by Global Positioning Systems (GPS), assisted GPS, cellular triangulation, or Wi-Fi triangulation.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for using a geo-fence, the system comprising:
   a geo-fence server to:
   receive geographical coordinates of a device;
   determine that the device is located in a geo-fence;
   determine a type of the geo-fence, the type selected from a set of types including private geo-fences and public geo-fences, and the type designated in a user interface that provides an option to set the geo-fence as private or public; and
   transmit a notification to the device based on the type of the geo-fence.

2. The system of claim 1, wherein the type of the geo-fence area is a private geo-fence.

3. The system of claim 2, wherein to transmit the notification to the device, the geo-fence server is adapted to:
   identify a user of the device;
   determine whether the user is a valid recipient of the notification; and
   transmit the notification when the user is a valid recipient.

4. The system of claim 2, wherein to transmit the notification to the device, the geo-fence server is adapted to:
   identify a user of the device;
   determine whether the user is a member of a group associated with the private geo-fence; and
   transmit the notification when the user is a member of the group associated with the private geo-fence.

5. The system of claim 4, wherein the group is defined based on a social network group associated with the user.

6. The system of claim 2, wherein the private geo-fence is a personal geo-fence.

7. The system of claim 6, wherein to transmit the notification to the device, the geo-fence server is adapted to:
   identify a user of the device;
   determine whether the user is a creator of the geo-fence; and
   transmit the notification when the user is the creator of the geo-fence.

8. A mobile device for using person-to-person geo-fences, the mobile device adapted to:
   receive a geo-fence object;
   store the geo-fence object at the mobile device;
   subsequent to storing the geo-fence object, obtain a geographical position of the mobile device;
   determine, at the mobile device, whether the mobile device is located in a geo-fence based on the geographical position;
   determine, at the mobile device, whether the geo-fence object is associated with the geo-fence; and
   present the geo-fence object when the geo-fence object is associated with the geo-fence.

9. The mobile device of claim 8, wherein to present the geo-fence object, the mobile device is adapted to:
   determine whether the geo-fence object associated with the geo-fence is active; and
   present the geo-fence object when the geo-fence object is active.

10. The mobile device of claim 8, wherein to receive the goo-fence object, the mobile device is adapted to evaluate a source of the goo-fence object to determine whether the source is a trusted source; and
    wherein to store the geo-fence object, the mobile device is adapted to keep the geo-fence object when the source is determined to be a trusted source.

11. The mobile device of claim 10, wherein the mobile device is adapted to:
    present an indication that the geo-fence object is from a trusted source when presenting the geo-fence object.

12. The mobile device of claim 10, wherein to valuate the source to determine whether the source is a trusted source, the mobile device is adapted to:
    identify the source;
    access a local database to determine whether the source is on a whitelist; and
    determine that the source is a trusted source when the source is on the whitelist.

13. A method for using public and private geo-fences, the method comprising:
- receiving at a geo-fence server, geographical coordinates of a device;
- determining by the geo-fence server that the device is located in a geo-fence;
- determining a type of the geo-fence, the type selected from a set of types including private geo-fences and public geo-fences, and the type designated in a user interface that provides an option to set the geo-fence as private or public; and
- transmitting a notification to the device based on the type of the geo-fence.

14. The method of claim 13, wherein the type of the geo-fence area is a public geo-fence from a trusted source.

15. The method of claim 14, wherein the trusted source is authenticated using a certificate system.

16. The method of claim 15, wherein transmitting the notification comprises transmitting an indication that the public geo-fence is from a trusted source.

17. A method for using person-to-person geo-fences, the method comprising:
- receiving a geo-fence object at a mobile device;
- storing the geo-fence object at the mobile device;
- subsequent to storing the geo-fence object, obtaining a geographical position of the mobile device;
- determining, at the mobile device, whether the mobile device is located in a geo-fence based on the geographical position;
- determining, at the mobile device, whether the geo-fence object is associated with the geo-fence; and
- presenting the geo-fence object when the geo-fence object is associated with the geo-fence.

18. The method of claim 17, wherein storing the geo-fence object includes discarding the geo-fence object when the source is determined not to be a trusted source.

19. The method of claim 17, wherein the geo-fence object is an extensible markup language (XML) object.

20. The method of claim 17, wherein the geo-fence object was received over a messaging service.

21. The method of claim 20, wherein the messaging service is one of SMS or MMS.

22. The method of claim 17, wherein the geographical position is obtained by Global Positioning Systems (GPS), assisted GPS, cellular triangulation, or Wi-Fi triangulation.

23. A machine-readable medium including instructions for using public and private geo-fences, which when executed by a machine, cause the machine to perform operations comprising:
- receiving at a geo-fence server, geographical coordinates of a device;
- determining by the geo-fence server that the device is located in a geo-fence;
- determining a type of the geo-fence, the type selected from a set of types including private geo-fences and public geo-fences, and the type designated in a user interface that provides an option to set the geo-fence as private or public; and
- transmitting a notification to the device based on the type of the geo-fence.

24. A machine-readable medium including instructions for using person-to-person geo-fences, which when executed by a machine, cause the machine to perform operations comprising:
- receiving a geo-fence object at a mobile device;
- storing the geo-fence object at the mobile device;
- subsequent to storing the geo-fence object, obtaining a geographical position of the mobile device;
- determining, at the mobile device, whether the mobile device is located in a geo-fence based on the geographical position;
- determining, at the mobile device, whether the geo-fence object is associated with the geo-fence; and
- presenting the geo-fence object when the geo-fence object is associated with the geo-fence.

* * * * *

UNITED STATES PATENT AND TRADEMARK OFFICE
CERTIFICATE OF CORRECTION

PATENT NO. : 9,712,962 B2  
APPLICATION NO. : 14/768704  
DATED : July 18, 2017  
INVENTOR(S) : Birch et al.

Page 1 of 1

It is certified that error appears in the above-identified patent and that said Letters Patent is hereby corrected as shown below:

In Column 18, Line 50, in Claim 10, delete "goo-fence" and insert --geo-fence-- therefor In Column 18, Line 51, in Claim 10, delete "goo-fence" and insert --geo-fence-- therefor In Column 18, Line 60, in Claim 12, delete "valuate" and insert --evaluate-- therefor Signed and Sealed this  
Tenth Day of April, 2018

Andrei Iancu  
*Director of the United States Patent and Trademark Office*